US009552661B2

(12) United States Patent
Durocher

(10) Patent No.: US 9,552,661 B2
(45) Date of Patent: Jan. 24, 2017

(54) DISTINGUISHING SUPERIMPOSED LINKS TO A NODE BY SPREADING CONNECTION POINTS OF LINKS TO NODE ACCORDING TO COORDINATES OF BEND POINT OR OPPOSITE END POINT OF LINKS

(75) Inventor: Eric Durocher, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 1756 days.

(21) Appl. No.: 12/871,481

(22) Filed: Aug. 30, 2010

(65) Prior Publication Data

US 2012/0032987 A1 Feb. 9, 2012

(30) Foreign Application Priority Data

Aug. 9, 2010 (EP) ..................... 10305876

(51) Int. Cl.
*G06T 11/00* (2006.01)
*G06T 11/20* (2006.01)

(52) U.S. Cl.
CPC .............. *G06T 11/206* (2013.01); *G06T 11/00* (2013.01); *G06T 11/20* (2013.01)

(58) Field of Classification Search
USPC ........................................................ 345/440
See application file for complete search history.

(56) References Cited

U.S. PATENT DOCUMENTS

| 5,798,769 A | 8/1998 | Chiu et al. |
| 7,046,246 B2 | 5/2006 | Saitou |
| 7,483,028 B2 | 1/2009 | Wong et al. |
| 2006/0209085 A1* | 9/2006 | Wong et al. ................. 345/629 |
| 2009/0089715 A1 | 4/2009 | Dickey |
| 2009/0319948 A1 | 12/2009 | Stannard et al. |

OTHER PUBLICATIONS

Spönemann, Miro. On the automatic layout of data flow diagrams. Diss. Diploma thesis, Christian-Albrechts-Universität zu Kiel, Department of Computer Science (Mar. 2009), http://rtsys. informatik. uni-kiel. de/~ biblio/downloads/theses/msp-dt. pdf, 2009.*

* cited by examiner

*Primary Examiner* — Ulka Chauhan
*Assistant Examiner* — Schiller Hill
(74) *Attorney, Agent, or Firm* — Robert A. Voigt, Jr.; Winstead, P.C.

(57) ABSTRACT

A method, system and computer program product for distinguishing superimposed links to a node in a drawing area. Links connected to a side of a node involved in an editing interaction are identified. The order of the identified links to be connected to the side of the node is determined by sorting the identified links based on the coordinates of the links' bend point and/or opposite end point. The connection points of these identified links are repositioned based on this determined order. By only repositioning the connection points to the node involved in the editing interaction instead of rerouting all of the links in the diagram area, the processing time is improved. Furthermore, by repositioning the connection points that were superimposed so that they are spaced apart based on the coordinates of the links' bend point and/or opposite end point, it is easier to distinguish between the different links.

21 Claims, 4 Drawing Sheets

DISTINGUISHING SUPERIMPOSED LINKS TO A NODE BY SPREADING CONNECTION POINTS OF LINKS TO NODE ACCORDING TO COORDINATES OF BEND POINT OR OPPOSITE END POINT OF LINKS

CROSS-REFERENCE TO RELATED APPLICATIONS

This application claims priority from European Patent Application No. EP10305876, filed on Aug. 9, 2010, the contents of which are incorporated herein by reference.

TECHNICAL FIELD

The present invention relates to diagram software, and more particularly to distinguishing superimposed links to a node in a drawing area by spreading the connection points of the links to the node according to the coordinates of a bend point and/or opposite end point of the links.

BACKGROUND OF THE INVENTION

Drawing or diagram software allows a user to graphically represent relationships between elements. For example, organizational structures, network structures, flowcharts, and the like may be visually represented by graphical "nodes" and "links." An element may be represented as a "node" and nodes may be connected by "links." Typically, drawing software includes a diagram editor, which refers to a drawing area on the screen that allows users to interactively create nodes and to connect them by links. Creating a link may be performed by selecting a first node with a mouse click thereby indicating the start point of the link and then dragging the mouse to a second node thereby indicating the end point of the link. The start and end points are connected to their respective nodes at what is referred to herein as "connection points."

When several links are created from a particular side of a node, they may all have the same connection point on that side. That is, the connection points of the links will be superimposed thereby making it difficult to distinguish between different links. Furthermore, if these links end on the same node, they may even be completely superimposed thereby preventing the user from completely distinguishing them visually.

As a result, a rerouting tool may be implemented which reroutes all of the links in the diagram in an attempt to clarify the connections. However, this tool may reroute links that are unrelated to any link that needs to be distinguished. As a result, the rerouted diagram may be confusing to the user from a usability point of view. Furthermore, the rerouting tool uses a lot of processing time since it reroutes all the links in the diagram instead of rerouting only those links that need to be distinguished.

BRIEF SUMMARY OF THE INVENTION

In one embodiment of the present invention, a method for distinguishing superimposed links to a node in a drawing area of a computer screen comprises identifying links connected to a side of a node involved in an editing interaction. The method further comprises determining an order of the identified links to be connected to the side of the node involved in the editing interaction by sorting the identified links based on coordinates of a bend point and/or an opposite end point of the identified links. Additionally, the method comprises repositioning connection points of the identified links to the side of the node involved in the editing interaction based on the determined order.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

Figure 1:
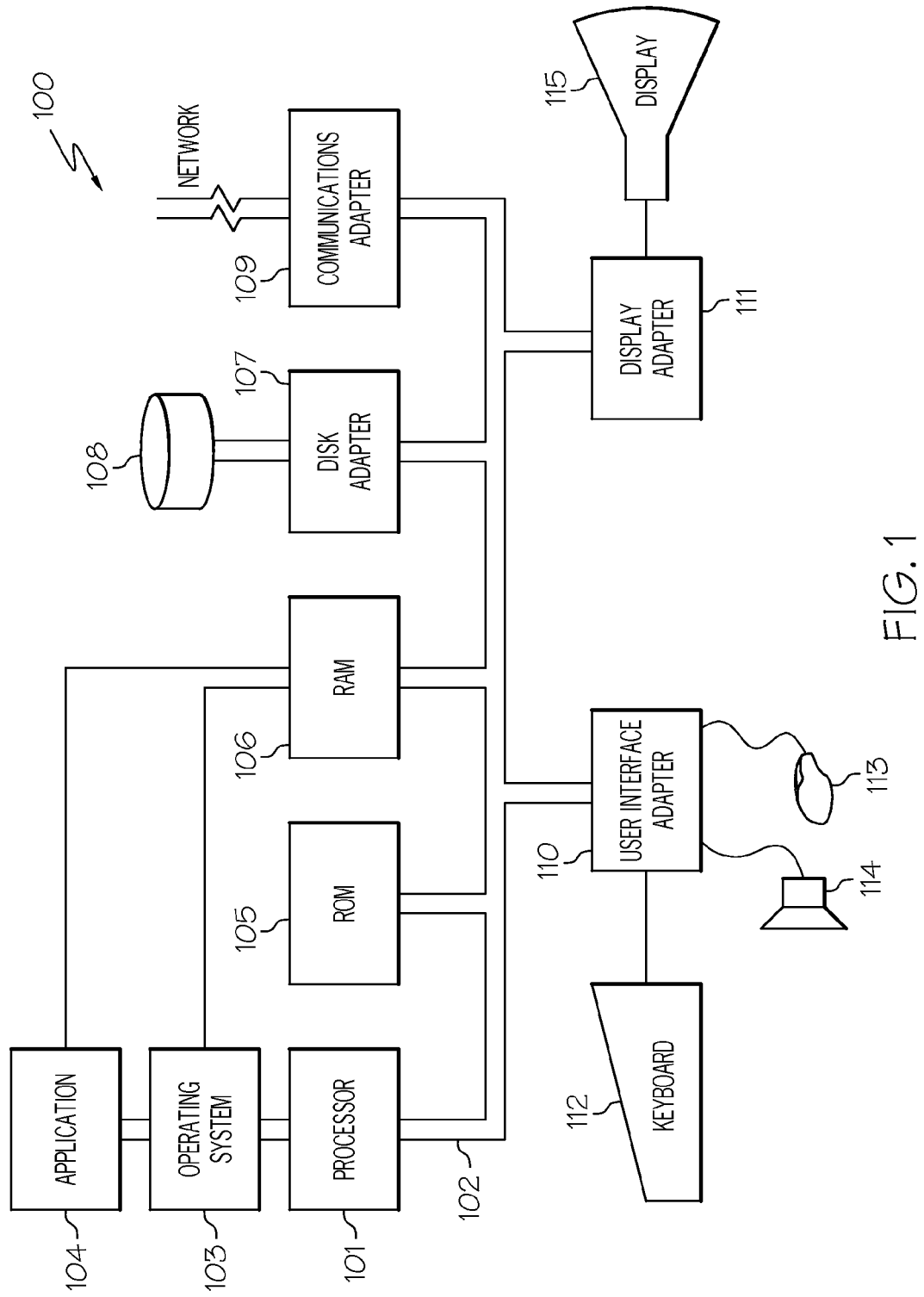
FIG. 1 is a configuration of a computer system configured in accordance with an embodiment of the present invention.

The present invention comprises a method, system and computer program product for distinguishing superimposed links to a node in a drawing area of a computer screen. In one embodiment of the present invention, links connected to a side of a node involved in an editing interaction are identified. An editing interaction may involve creating a link, deleting a link, moving a node, and deleting a node. The positions (e.g., horizontal and/or vertical coordinates) of either a bend point or an opposite end point of the identified links are determined. If the link has two or more bend points, then the coordinate of the second bend point will be used in determining its order among the other identified links as discussed below. If the link has a single bend point, then the coordinate of that single bend point will be used in determining its order among the other identified links as discussed below. Furthermore, if the link does not have any bend points, then the coordinate of its opposite end point will be used in determining its order among the other identified links as discussed below. If the identified links are connected to the node in a horizontal manner, then the vertical coordinate of a bend point or an opposite end point for each identified link is compared with respect to each other. The identified links may then be sorted based on the vertical coordinates of its bend point and/or opposite end point such that links whose bend point or opposite end point has a higher vertical coordinate will be ranked higher than those with a lower vertical coordinate. Similarly, if the identified links are connected to the node in a vertical manner, then the horizontal coordinate of a bend point or an opposite end point for each identified link is compared with respect to each other. The identified links may then be sorted based on the horizontal coordinates of its bend point and/or opposite end point such that links whose bend point or opposite end point has a higher horizontal coordinate will be ranked higher than those with a lower horizontal coordinate. The connection points of these links to the side of the node involved in the editing interaction are repositioned based on the sorted order such that those links whose bend point or opposite end point has a higher horizontal/vertical coordinate will have their connection point placed higher vertically/horizontally than those links whose bend point or opposite end point has a lower horizontal/vertical coordinate. By only repositioning the connection points to the node involved in the editing interaction instead of rerouting all of the links in the diagram area, the efficiency of the processing time is greatly improved. Furthermore, by repositioning the connection points that were superimposed so that they are spaced apart based on the coordinates of the links' bend point or opposite end point, it is easier to distinguish between the different links.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of a hardware configuration of a computer system 100 which is representative of a hardware environment for practicing the present invention. Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application for distinguishing superimposed links to a node in a drawing area as discussed further below in association with FIGS. 2-8.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for distinguishing superimposed links to a node in a drawing area as discussed further below in association with FIGS. 2-8, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, when several links are created in a diagram editor from a particular side of a node, they may all have the same connection point on that side. That is, the connection points of the links will be superimposed thereby making it difficult to distinguish between different links. Furthermore, if these links end on the same node, they may even be completely superimposed thereby preventing the user from completely distinguishing them visually.

Figure 3:
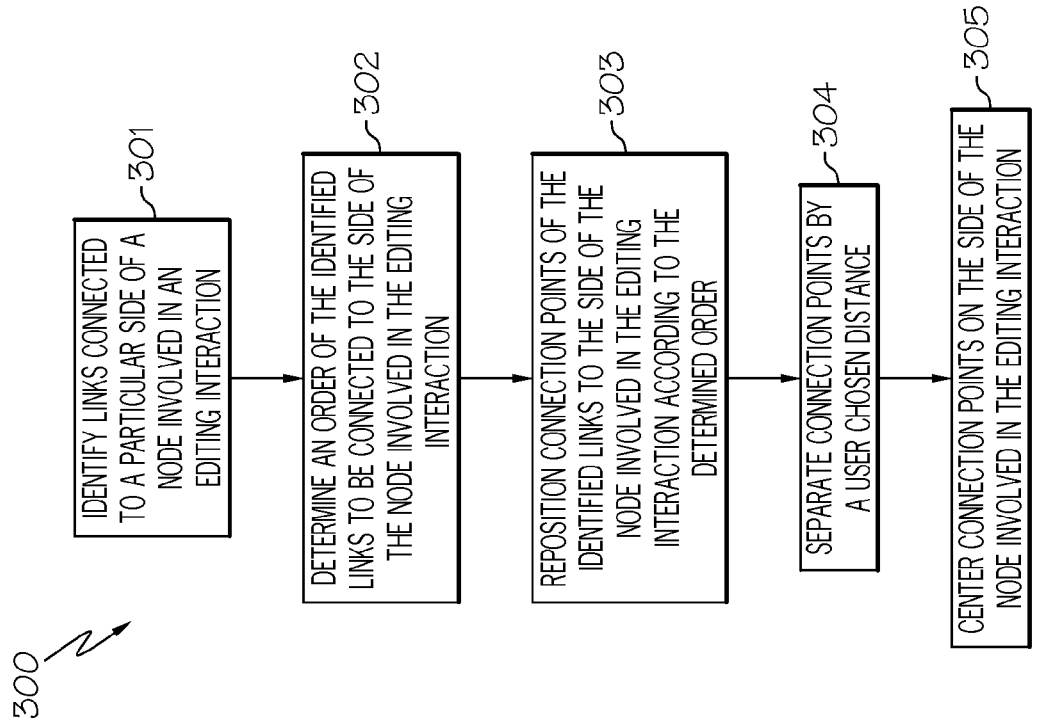
FIG. 3 is a flowchart of a method for distinguishing superimposed links to a node in a drawing area in accordance with an embodiment of the present invention.
Figure 2:
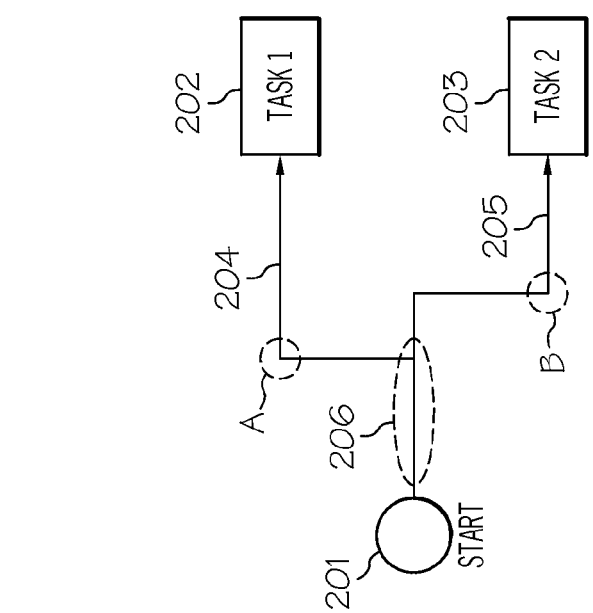
FIG. 2 illustrates links being superimposed at a connection point at a side of a node in a diagram editor.
Figure 4:
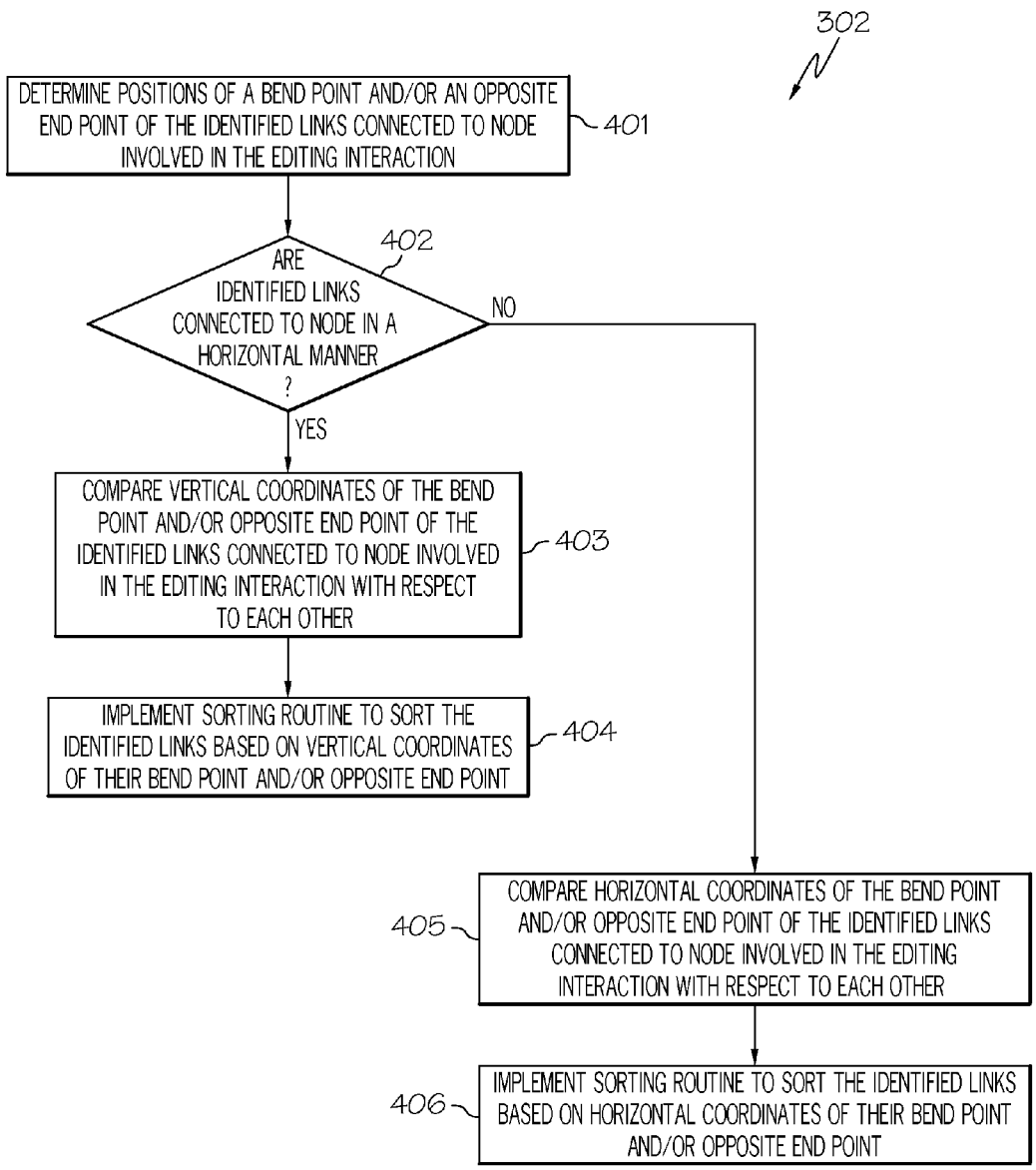
FIG. 4 is a flowchart of the sub-steps of determining the order of the identified links to be connected to the side of the node involved in the editing interaction in accordance with an embodiment of the present invention.
Figure 5:
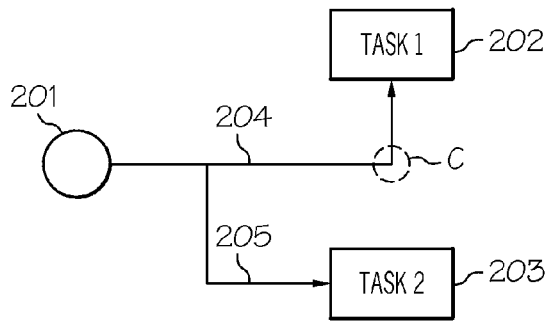
FIG. 5 illustrates a link with a single bend point which will be used in determining its order among the links in accordance with an embodiment of the present invention.
Figure 6:
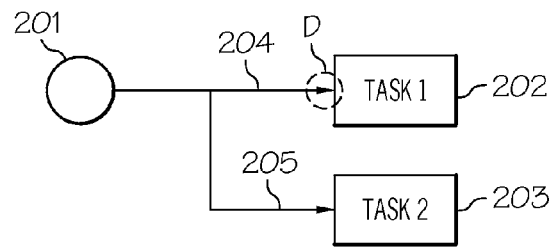
FIG. 6 illustrates a link with no bend points and having its opposite end point be used in determining its order among the links in accordance with an embodiment of the present invention.
Figure 7:
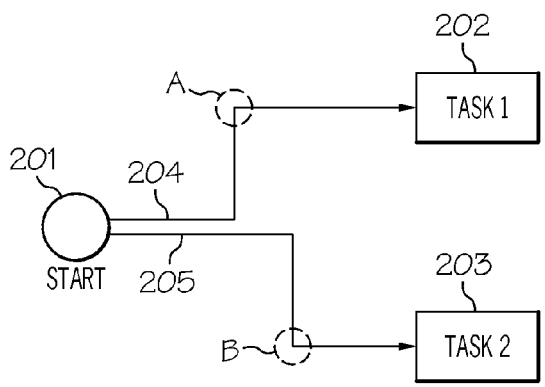
FIG. 7 illustrates repositioning the connection points of the links to the node in the diagram editor using the principles of the present invention.
Figure 8:
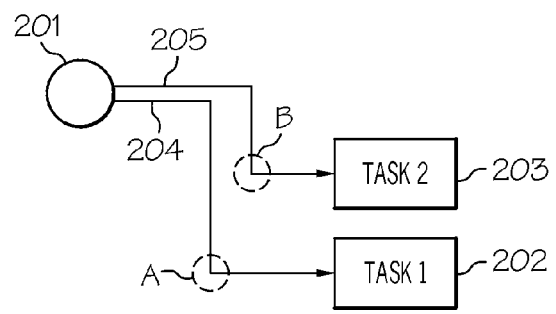
FIG. 8 illustrates the repositioning of the connection points of the links to the node in the diagram editor when other nodes are moved using the principles of the present invention.

The principles of the present invention provide a technique for spreading the connection points of the links to the node according to the coordinates of a bend point and/or opposite end point of the links as discussed below in connection with FIGS. 2-8. FIG. 2 illustrates links being superimposed at a connection point to a node in a diagram editor. FIG. 3 is a flowchart of a method for distinguishing superimposed links to a node in a drawing area. FIG. 4 is a flowchart of the sub-steps of determining an order of the identified links to be connected to the side of the node involved in the editing interaction. FIG. 5 illustrates a link with a single bend point which will be used in determining its order among the links FIG. 6 illustrates a link with no bend points and having its opposite end point be used in determining its order among the links in accordance with an embodiment of the present invention. FIG. 7 illustrates repositioning the connection points of the links to the node in the diagram editor using the principles of the present invention. FIG. 8 illustrates the repositioning of the connection points of the links to the node in the diagram editor when other nodes are moved using the principles of the present invention.

Referring to FIG. 2, FIG. 2 illustrates links being superimposed at a connection point at a side of a node in a diagram editor. As illustrated in FIG. 2, node 201 (identified by "Start" in FIG. 2) is connected to node 202 (identified by "Task 1" in FIG. 2) and node 203 (identified by "Task 2" in FIG. 2) via links 204, 205, respectively. As shown in FIG. 2, links 204 and 205 are superimposed at area 206 thereby making it difficult for the user to distinguish between these different links. The principles of the present invention provide a technique for distinguishing these different links using the method discussed below in connection with FIGS. 3-4.

FIG. 3 is a flowchart of a method 300 for distinguishing superimposed links to a node in a drawing area in accordance with an embodiment of the present invention.

Referring to FIG. 3, in conjunction with FIGS. 1 and 2, in step 301, links connected to a particular side of a node involved in an editing interaction are identified. Editing interactions may include creating a new link, deleting a link, moving a node, deleting a node, etc. For example, suppose that link 205 was recently added to establish a connection between nodes 201, 203 as shown in FIG. 2. Hence, links 204, 205 connected to a particular side (e.g., right side) of node 201 involved in an editing interaction are identified. It is noted that being connected to a particular "side" of a node, as used herein, refers to being connected to either the left, right, top or bottom side of the node.

In another example, suppose that nodes 202, 203 were rearranged such that node 203 has a higher vertical coordinate than node 202. While node 201 was not moved, it still would be considered as a node involved in an editing interaction as the links from node 201 were shifted due to the movement of nodes 202, 203. Hence, a "node involved in an editing interaction," as used herein, may involve a node that is either directly or indirectly involved in at least one of the interactions discussed above.

In step 302, the order of the identified links to be connected to the side of the node involved in the editing interaction is determined. Step 302 includes the sub-steps described in FIG. 4.

FIG. 4 is a flowchart of the sub-steps of determining the order of the identified links to be connected to the side of the node involved in the editing interaction in accordance with an embodiment of the present invention.

Referring to FIG. 4, in conjunction with FIGS. 1-3, in step 401, the positions of a bend point and/or opposite end point of the identified links (e.g., links 204, 205) connected to the node (e.g., node 201) involved in the editing interaction are determined. A position, as used herein, may refer to the x (horizontal) and y (vertical) coordinates in a two-dimensional drawing area. If the link has two or more bend points, then the coordinate of the second bend point will be used in determining its order among the other identified links as discussed below. For example, referring to FIG. 2, since links 204, 205 have two bend points, the second bend point identified as "A" and "B" in links 204, 205, respectively, will be used in determining its order as discussed further below in connection with FIG. 7.

If the link has a single bend point, as illustrated in FIG. 5, then the coordinate of that single bend point will be used in determining its order among the other identified links as discussed below. Referring to FIG. 5, link 204 of FIG. 2 now has a single bend point identified as "C" which will be used in determining its order among the other identified links in accordance with an embodiment of the present invention.

Furthermore, if the link does not have any bend points, as illustrated in FIG. 6, then the coordinate of its opposite end point will be used in determining its order among the other identified links as discussed below. Referring to FIG. 6, link 204 of FIG. 2 now does not have any bend points and its opposite end point, identified as "D," will be used in determining its order among the other identified links in accordance with an embodiment of the present invention. "Opposite end point," as used herein, may refer to the end that is opposite the node that is involved in the editing interaction. For example, referring to FIG. 6, the opposite end point of link 204 is the end towards node 202.

It is noted for clarity that there may be multiple links connected to a node involved in an editing interaction where a portion of these links may contain only a single bend point, another portion of these links may contain two or more bend points and another portion of these links may contain no bend points. Hence, the order of these links to be connected to the node involved in the editing interaction may be determined based on the coordinates of a single bend point, the coordinates of the second bend point as well as the coordinates of the opposite end point or any combination thereof.

Returning to FIG. 4, in conjunction with FIGS. 1-3, in step 402, a determination is made as to whether the identified links (e.g., links 204, 205) are connected to the side of the node (e.g., node 201) in a horizontal manner. As illustrated in FIG. 2, links 204, 205 are connected to node 201 in a horizontal manner. If links 204, 205 were connected to node 201 from the top or bottom side of node 201, then links 204, 205 would be deemed to have been connected to node 201 in a vertical manner.

If the identified links are connected to the node involved in the editing interaction in a horizontal manner, then, in step 403, the vertical coordinates of the bend point and/or opposite end point of the identified links (e.g., links 204, 205) connected to the node involved in the editing interaction are compared with respect to each other. For example, as stated above in connection with FIG. 2, links 204, 205 both have two bend points. Hence, the coordinate of the second bend point of links 204, 205 identified by "A" and "B," respectively, will be used in the comparison. As illustrated in FIG. 2, the second bend point ("A") of link 204 has a higher vertical coordinate than the second bend point ("B") of link 205. For easier understanding, the term "higher," as used herein, means closest to the upper side of the screen even though on some computer systems, coordinates, such as vertical coordinates, increase downwards from the top of the screen to the bottom of the screen.

In step 404, a sorting routine (e.g., quicksort algorithm) is implemented to sort the identified links based on the vertical coordinates of their bend point and/or opposite end point. For example, the sorting routine would sort links 204, 205 based on the vertical coordinates of their second bend point. Since the second bend point ("A") of link 204 has a higher vertical coordinate than the second bend point ("B") of link 205, link 204 would be ranked higher than link 205. It is noted for clarity that the sorting routine may be applied to sort any number of links. For instance, there could be ten links that are connected to the same node. The sorting routine could rank these ten links based on their bend point's or opposite end point's vertical coordinates from highest to lowest.

Alternatively, if the identified links are connected to the side of the node involved in the editing interaction in a vertical manner, then, in step 405, the horizontal coordinates of the bend point and/or opposite end point of the identified links (e.g., links 204, 205) connected to the node involved in the editing interaction are compared with respect to each other.

In step 406, the sorting routine (e.g., quicksort algorithm) is implemented to sort the identified links based on the horizontal coordinates of their bend point and/or opposite end point.

Returning to FIG. 3, in conjunction with FIGS. 1-2, in step 303, the connection points of the identified links will be repositioned according to the order determined in step 302. For example, referring to FIG. 7, FIG. 7 illustrates the repositioning of the connection point of links 204, 205 to node 201 of FIG. 2 according to the order determined in step 302 (connection point of link 204 is positioned higher than the connection point of link 205 since the second bend point ("A") of link 204 has a higher vertical coordinate than the second bend point ("B") of link 205) in accordance with an embodiment of the present invention. In another example, if the elements 202, 203 were shifted so that the second bend point ("B") of link 205 has a higher vertical coordinate than the second bend point ("A") of link 204, then the connection point to node 201 of link 205 would be higher than the connection point to node 201 of link 204 as illustrated in FIG. 8 in accordance with an embodiment of the present invention. By only repositioning the connection points to the node involved in an editing interaction instead of rerouting all of the links in the diagram area, the efficiency of the processing time is greatly improved. Furthermore, by repositioning the connection points that were superimposed so that they are spaced apart based on the coordinates of the links' bend point or opposite end point, it is easier to distinguish between the different links.

Returning to FIG. 3, in conjunction with FIGS. 1-2 and 7, in step 304, the connection points to the node (e.g., 201) involved in the editing interaction are separated by a user chosen distance. For example, referring to FIG. 7, the spacing between the connection points of node 201 by links 204, 205 may be separated by a user chosen distance. In this manner, it may be easier to distinguish between the different links.

In step 305, the connection points may be centered on the side of the node involved in the editing interaction. For example, referring to FIG. 7, the connection points of node 201 by links 204, 205 may be centered. In this manner, it may be easier to distinguish between the different links.

Method 300 may include other and/or additional steps that, for clarity, are not depicted. Further, method 300 may be executed in a different order presented and that the order presented in the discussion of FIGS. 3 and 4 is illustrative. Additionally, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for distinguishing superimposed links to a node in a drawing area of a computer screen, the method comprising:
    identifying links connected to a side of a node involved in an editing interaction;
    determining an order of said identified links to be connected to said side of said node involved in said editing interaction by sorting said identified links based on coordinates of one or more of a bend point and an opposite end point of said identified links; and
    repositioning connection points of said identified links to said side of said node involved in said editing interaction based on said determined order.

2. The method as recited in claim 1, wherein said editing interaction comprises one of the following: creating a link, deleting a link, moving a node, and deleting a node.

3. The method as recited in claim 1, wherein if a link of said identified links comprises a single bend point, then a coordinate of said single bend point is used in determining said order of said link among said identified links, wherein if said link of said identified links comprises two or more bend points, then a coordinate of a second bend point is used in determining said order of said link among said identified links, wherein if said link of said identified links does not comprise a bend point, then a coordinate of an opposite end point of said link is used in determining said order of said link among said identified links.

4. The method as recited in claim 1 further comprising:
    comparing vertical coordinates of one or more of said bend point and said opposite end point of said identified links with respect to each other if said identified links are connected to said side of said node in a horizontal manner; and
    sorting said identified links based on said vertical coordinates of one or more of said bend point and said opposite end point of said identified links.

5. The method as recited in claim 1 further comprising:
    comparing horizontal coordinates of one or more of said bend point and said opposite end point of said identified links with respect to each other if said identified links are connected to said side of said node in a vertical manner; and
    sorting said identified links based on said horizontal coordinates of one or more of said bend point and said opposite end point of said identified links.

6. The method as recited in claim 1 further comprising:
    separating said connection points of said identified links to said side of said node by a user chosen distance.

7. The method as recited in claim 6 further comprising:
    centering said connection points of said identified links to said side of said node.

8. A computer program product embodied in a computer readable storage medium for distinguishing superimposed links to a node in a drawing area of a computer screen, the computer program product comprising the programming instructions for:
    identifying links connected to a side of a node involved in an editing interaction;
    determining an order of said identified links to be connected to said side of said node involved in said editing interaction by sorting said identified links based on coordinates of one or more of a bend point and an opposite end point of said identified links; and
    repositioning connection points of said identified links to said side of said node involved in said editing interaction based on said determined order.

9. The computer program product as recited in claim 8, wherein said editing interaction comprises one of the following: creating a link, deleting a link, moving a node, and deleting a node.

10. The computer program product as recited in claim 8, wherein if a link of said identified links comprises a single bend point, then a coordinate of said single bend point is used in determining said order of said link among said identified links, wherein if said link of said identified links comprises two or more bend points, then a coordinate of a second bend point is used in determining said order of said link among said identified links, wherein if said link of said identified links does not comprise a bend point, then a coordinate of an opposite end point of said link is used in determining said order of said link among said identified links.

11. The computer program product as recited in claim 8 further comprising the programming instructions for:
    comparing vertical coordinates of one or more of said bend point and said opposite end point of said identified links with respect to each other if said identified links are connected to said side of said node in a horizontal manner; and
    sorting said identified links based on said vertical coordinates of one or more of said bend point and said opposite end point of said identified links.

12. The computer program product as recited in claim 8 further comprising the programming instructions for:
    comparing horizontal coordinates of one or more of said bend point and said opposite end point of said identified links with respect to each other if said identified links are connected to said side of said node in a vertical manner; and
    sorting said identified links based on said horizontal coordinates of one or more of said bend point and said opposite end point of said identified links.

13. The computer program product as recited in claim 8 further comprising the programming instructions for:
    separating said connection points of said identified links to said side of said node by a user chosen distance.

14. The computer program product as recited in claim 13 further comprising the programming instructions for:
    centering said connection points of said identified links to said side of said node.

15. A system, comprising:
    a memory unit for storing a computer program for distinguishing superimposed links to a node in a drawing area of a computer screen; and
    a processor coupled to said memory unit, wherein said processor, responsive to said computer program, comprises:
        circuitry for identifying links connected to a side of a node involved in an editing interaction;
        circuitry for determining an order of said identified links to be connected to said side of said node involved in said editing interaction by sorting said identified links based on coordinates of one or more of a bend point and an opposite end point of said identified links; and circuitry for repositioning connection points of said identified links to said side of said node involved in said editing interaction based on said determined order.

16. The system as recited in claim 15, wherein said editing interaction comprises one of the following: creating a link, deleting a link, moving a node, and deleting a node.

17. The system as recited in claim 15, wherein if a link of said identified links comprises a single bend point, then a coordinate of said single bend point is used in determining said order of said link among said identified links, wherein if said link of said identified links comprises two or more bend points, then a coordinate of a second bend point is used in determining said order of said link among said identified links, wherein if said link of said identified links does not comprise a bend point, then a coordinate of an opposite end point of said link is used in determining said order of said link among said identified links.

18. The system as recited in claim 15, wherein said processor further comprises:
   circuitry for comparing vertical coordinates of one or more of said bend point and said opposite end point of said identified links with respect to each other if said identified links are connected to said side of said node in a horizontal manner; and
   circuitry for sorting said identified links based on said vertical coordinates of one or more of said bend point and said opposite end point of said identified links.

19. The system as recited in claim 15, wherein said processor further comprises:
   circuitry for comparing horizontal coordinates of one or more of said bend point and said opposite end point of said identified links with respect to each other if said identified links are connected to said side of said node in a vertical manner; and
   circuitry for sorting said identified links based on said horizontal coordinates of one or more of said bend point and said opposite end point of said identified links.

20. The system as recited in claim 15, wherein said processor further comprises:
   circuitry for separating said connection points of said identified links to said side of said node by a user chosen distance.

21. The system as recited in claim 20, wherein said processor further comprises:
   circuitry for centering said connection points of said identified links to said side of said node.

\* \* \* \* \*